United States Patent
Wang et al.

(10) Patent No.: US 9,881,395 B2
(45) Date of Patent: Jan. 30, 2018

(54) RENDERING MULTI-PART GLYPHS

(71) Applicant: SAP SE, Walldorf (DE)

(72) Inventors: Shihui Wang, Wiesloch (DE); Jasmin Bajric, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/831,893

(22) Filed: Aug. 21, 2015

(65) Prior Publication Data
US 2017/0053424 A1 Feb. 23, 2017

(51) Int. Cl.
G06T 11/20 (2006.01)
G06F 17/21 (2006.01)

(52) U.S. Cl.
CPC .......... G06T 11/203 (2013.01); G06F 17/214 (2013.01)

(58) Field of Classification Search
None
See application file for complete search history.

(56) References Cited

U.S. PATENT DOCUMENTS

| 6,091,505 A * | 7/2000 | Beaman ................ G06F 17/214 358/1.11 |
| 7,292,249 B2 * | 11/2007 | Stamm ..................... G09G 5/24 345/468 |
| 7,826,074 B1 | 11/2010 | Wang et al. |
| 7,940,273 B2 | 5/2011 | Gurcan et al. |
| 8,207,984 B2 | 6/2012 | Kuhns |
| 8,553,032 B1 | 10/2013 | Poston |
| 8,687,004 B2 | 4/2014 | Gonzalez et al. |
| 8,751,928 B2 | 6/2014 | Sun et al. |
| 2005/0251739 A1 | 11/2005 | Shur et al. |
| 2007/0139681 A1 | 6/2007 | Eschbach et al. |
| 2007/0143324 A1 | 6/2007 | Eichhorst |
| 2007/0211062 A1 | 9/2007 | Engelman et al. |
| 2008/0068383 A1 | 3/2008 | Dowling |
| 2009/0102846 A1 | 4/2009 | Flockermann et al. |
| 2012/0092305 A1 | 4/2012 | Barnes |
| 2012/0151393 A1 | 6/2012 | Arndt |
| 2014/0043339 A1 | 2/2014 | Taylor et al. |
| 2014/0362104 A1 * | 12/2014 | Hitchcock ................ G09G 5/06 345/593 |

OTHER PUBLICATIONS

Long Zheng, Microsoft adds multi-color fonts in Windows 8.1, proposes OpenType standard, http://www.startedsomething.com/20130628/microsoft-adds-multi-color-fonts-in-windows-8-1-proposes-opentype-standard/, Jun. 28, 2013.

(Continued)

Primary Examiner — Edward Martello
(74) Attorney, Agent, or Firm — Jones Day

(57) ABSTRACT

Disclosed herein are technologies for facilitating rendering of glyphs. In accordance with one aspect, a vector-based glyph is decomposed into multiple part-glyphs. A font file including rendering data of the part-glyphs is generated. The part-glyphs are individually configured with respective properties. A mapping file that includes configuration information of the part-glyphs may also be generated. The configuration information may include grouping information and the respective properties of the part-glyphs.

15 Claims, 5 Drawing Sheets

(56) References Cited

OTHER PUBLICATIONS

Wikipedia, Typophile, https://en.wikipedia.org/wiki/Typophile_(Internet_forum), 2002.
Dan McLachlan, Innovations in High Performance 2D Graphics with DirectX, http://channel9.msdn.com/Events/Build/2013/3-191, Jun. 26, 2013.
Fontcreator, http://www.highlogic.com/font-editor/fontoreator.html, retrieved on Jan. 12, 2016.

* cited by examiner

RENDERING MULTI-PART GLYPHS

TECHNICAL FIELD

The present disclosure relates generally to a framework for facilitating rendering of multi-part glyphs.

BACKGROUND

A glyph is an outline representation of a letter, number, symbol, character, etc. in a specific visual form. Glyphs may be rendered on a display device or medium by using raster graphics (or bitmaps). A bitmap includes a matrix of dots or pixels that define a shape delineating the glyph. Raster graphics are faster and easier to use in computer code, but non-scalable and require a separate font for each size. Since raster graphics are resolution-dependent, scaling or resizing raster graphics inevitably causes image quality to suffer.

Alternatively, glyphs may be rendered using vector graphics. Vector graphics are based on geometrical primitives (e.g., points, lines, curves, polygons, etc.) that are represented by mathematical expressions. Unlike raster graphics, vector graphics are resolution independent, and can be scaled to the desired size by scaling the underlying geometry without loss in apparent quality. One type of vector-based font is the TrueType font, which is an outline font standard developed by Apple and Microsoft. Using a TrueType font in which the glyphs are vector-based may overcome the disadvantages of raster graphics. However, traditional TrueType fonts are monochrome, and allows the user to specify only one foreground color.

SUMMARY

A computer-implemented technology for facilitating rendering of glyphs is described herein. In accordance with one aspect, a vector-based glyph is decomposed into multiple part-glyphs. A font file including rendering data of the part-glyphs is generated. The part-glyphs are individually configured with respective properties. A mapping file that includes configuration information of the part-glyphs may also be generated. The configuration information may include grouping information and the respective properties of the part-glyphs.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

The framework described herein may be implemented as a method, a computer-controlled apparatus, a computer process, a computing system, or as an article of manufacture such as a computer-usable medium.

One aspect of the present framework facilitates rendering of multi-part glyphs. A vector-based glyph may be decomposed into multiple part-glyphs, which are individually configured with properties. In some implementations, the multiple part-glyphs are individually configured with different colors to generate a multi-color glyph that can be rendered on a display device or any other medium. Color is not only an aesthetic feature, particularly in the field of icons, it can also contain important semantic information. The present framework provides a mechanism to render a multi-color glyph that is advantageously platform-independent and format-independent, and can be resized without any loss of apparent quality. These and various other features and advantages will be apparent from the following description.

Figure 1:
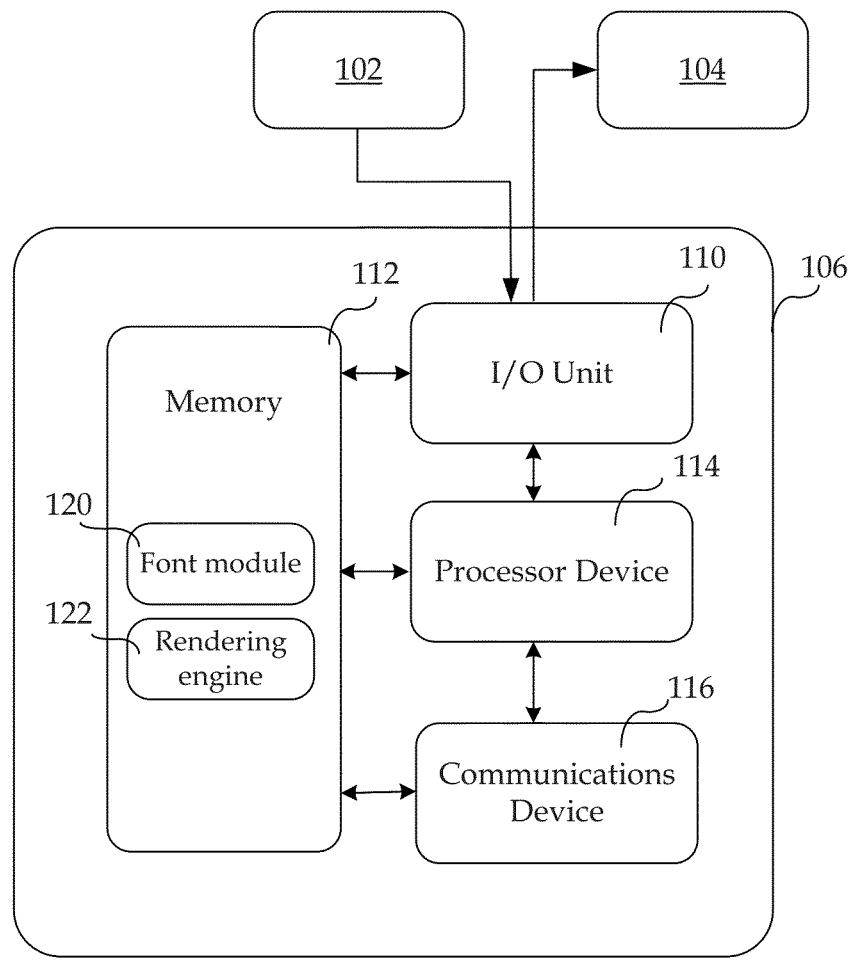
FIG. 1 is a block diagram illustrating an exemplary system.

FIG. 1 shows a block diagram illustrating an exemplary system 100 that may be used to implement the framework described herein. System 100 includes a computer system 106 communicatively coupled to an input device 102 (e.g., keyboard, touchpad, microphone, camera, etc.) and an output device 104 (e.g., display device, monitor, printer, speaker, etc.). Computer system 106 may include a communications device 116 (e.g., a modem, wireless network adapter, etc.) for exchanging data with a network using a communications link (e.g., telephone line, wireless or wired network link, cable network link, etc.). The network may be a local area network (LAN) or a wide area network (WAN).

Computer system 106 includes a processor device or central processing unit (CPU) 114, an input/output (I/O) unit 110, and a memory module 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a smart device (e.g., smart phone), a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various programs, such as a font module 120 and a rendering engine 122 for implementing the techniques described herein, all of which may be processed by processor device 114. As such, the computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein. It should be appreciated that the different components of the computer system 106 may be located on different machines. For example, font module 120 and rendering engine 122 may reside in different physical machines.

Figure 2:
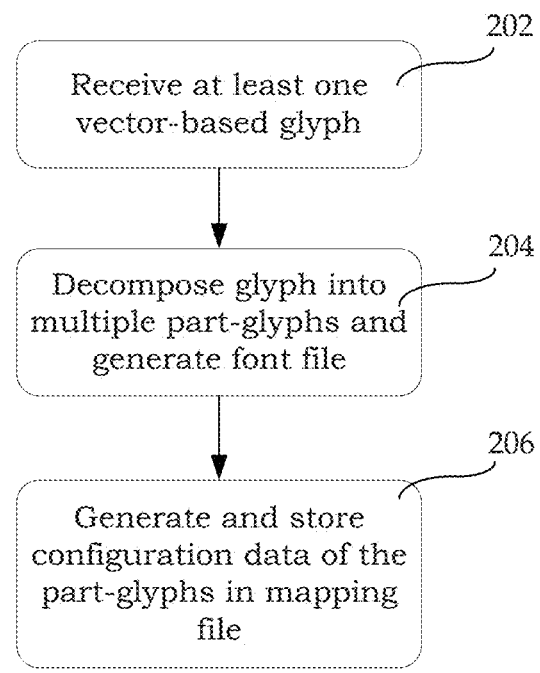
FIG. 2 is a block diagram illustrating an exemplary method of generating a multi-part glyph.

FIG. 2 is a block diagram illustrating an exemplary method 200 of generating a multi-part glyph. The computer system 106 of FIG. 1 may be configured by computer program code to implement some or all acts of the process 200. While process flow 200 describes a series of acts that are performed in sequence, it is to be understood that process 200 is not limited by the order of the sequence. For instance, some acts may occur in a different order than that described. In addition, an act may occur concurrently with another act. In some instances, not all acts may be performed.

At 202, font module 202 receives at least one vector-based glyph. A vector-based glyph is represented by geometrical primitives, such as points, lines, curves, polygons, etc., and mathematical formulae. For example, the vector-based glyph may be represented using straight line segments and/or Bezier splines. Other types of geometrical primitives are also useful. Exemplary vector-based glyphs include those associated with TrueType fonts, PostScript fonts, and so forth. Vector-based glyphs can advantageously be resized without loss of apparent quality.

At 204, font module 202 decomposes the glyph into multiple part-glyphs and generates a font file. Each part-glyph represents a single glyph that can be individually configured with one or more separate properties (e.g., color). Such decomposition may be performed manually, semi-automatically or automatically. For example, a font designer (or other user) may use a user interface to select the part-glyphs to be separated and configure the respective visual characteristics.

The font file provides rendering data of the part-glyphs and may be stored within the memory device 112 for use during runtime. In some implementations, the font file includes a glyph-outline table, which describes each part-glyph as a numbered sequence of points that are on or off a curve defining the outline of the part-glyph. Other types of description or information may also be included.

In some implementations, the position of each part-glyph is described with reference to a common bounding box. The bounding box encloses all the part-glyphs. The font file may store information, such as width, height, and/or coordinates of the corners of the bounding box. The position of each part-glyph may then be expressed in coordinates relative to, for example, a corner of the bounding box. Other types of representations are also useful. In some implementations, the font file is implemented in a TrueType font file format. Other types of file formats may also be used.

At 206, font module 202 generates and stores configuration information of the part-glyphs in a mapping file. The configuration information may include grouping information, such as the number of part-glyphs and which part-glyphs are associated with the parent multi-part glyph. The configuration information may also indicate the depthness or z-order of the associated part-glyphs. The z-order specifies the sequence of rendering the part-glyphs during runtime. To prevent smaller part-glyphs from being obscured, rendering may be performed according to the z-order to overlay layers of smaller part-glyphs on top of layers of bigger part-glyphs.

The configuration information may also indicate the individual properties of each part-glyph. Each part-glyph may be individually configured with one or more properties. Such properties may include visual characteristics such as color, which advantageously enables a multi-color glyph to be rendered. Other types of visual characteristics, such as transparency, weight, orientation, width, etc., may also be specified for each glyph or part-glyph. Additionally, other types of individual properties, such as Unicode index, the number of parts, bitmap icon name, etc., may also be specified for each corresponding glyph or part-glyph.

In some implementations, the mapping file is encoded using a generic language that advantageously enables it to be supported across most or all platforms and/or operating systems. An exemplary generic markup language is the Extensible Markup Language (XML) that defines a set of rules for encoding documents in a format which is both human-readable and machine-readable. Other types of languages, such as hypertext markup language (HTML), may also be used.

Figure 3:
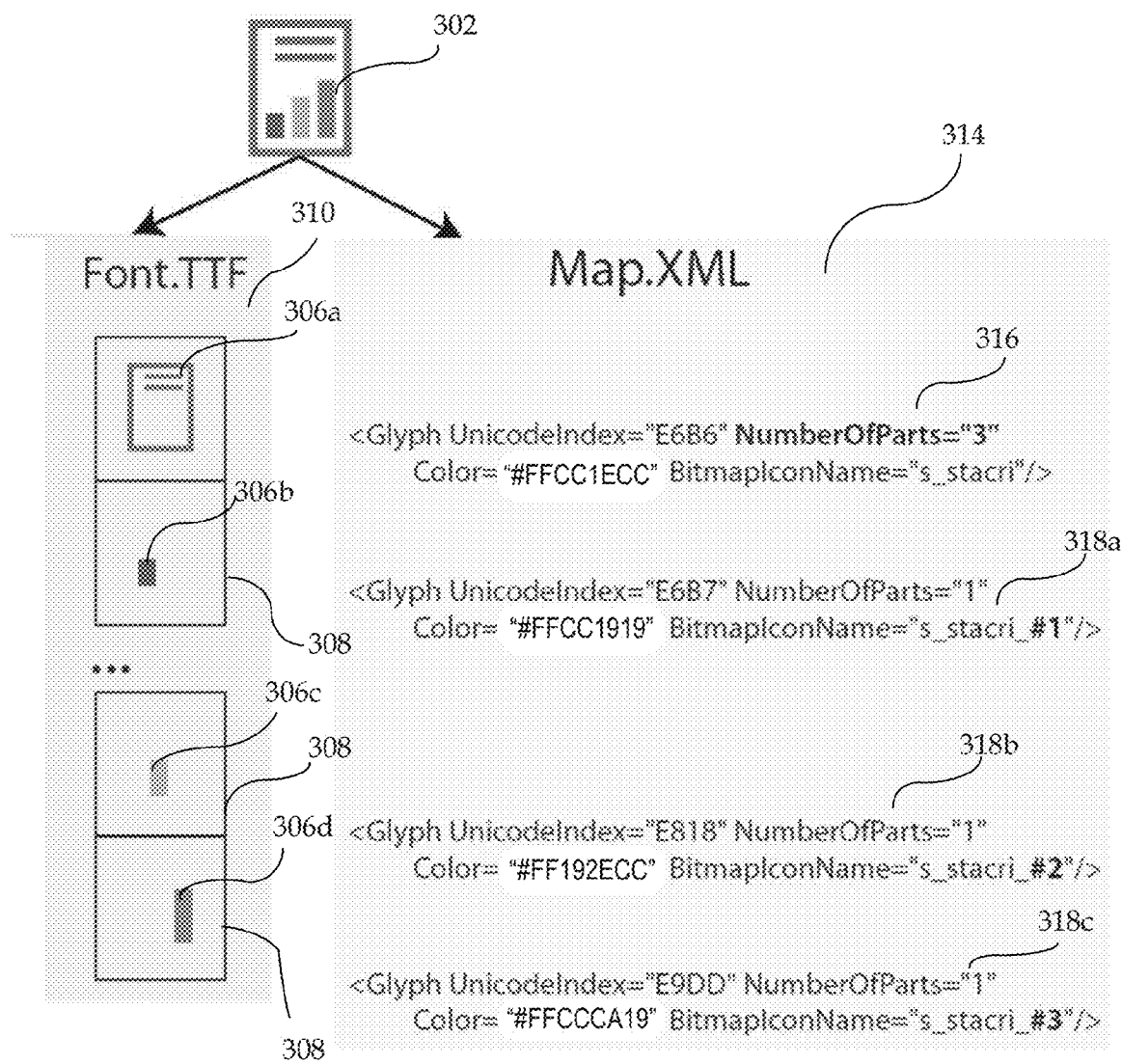
FIG. 3 illustrates an exemplary a multi-part glyph.

FIG. 3 illustrates an exemplary multi-part glyph 302. The multi-part glyph 302 includes multiple part-glyphs 306a-d. The multi-part glyph 302 may be described by a TrueType font file 310 and a corresponding XML mapping file 314. Font file 310 includes rendering data that describes the part-glyphs 306a-d, such as positioning data that specifies the position of each part-glyph relative to a common bounding box 308.

The mapping file 314 contains configuration information of the parent multi-part glyph 302 and the associated part-glyphs 306a-d. For example, the first entry 316 of the mapping file 314 corresponds to the main part-glyph 306a, while the next entries 318a-c correspond to the additional part-glyphs 306b-d. Each entry indicates individual properties of the corresponding glyph or part-glyph, such as the Unicode index, the number of parts, the color and the bitmap icon name, etc.

Figure 4:
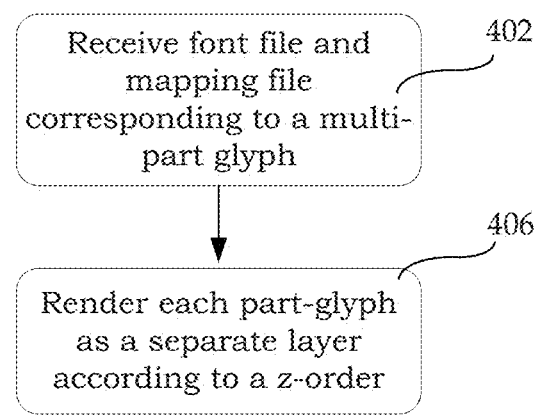
FIG. 4 is a block diagram illustrating an exemplary method of rendering a multi-part glyph.

FIG. 4 is a block diagram illustrating an exemplary method 400 of rendering a multi-part glyph. The computer system 106 of FIG. 1 may be configured by computer program code to implement some or all acts of the process 400. While process flow 400 describes a series of acts that are performed in sequence, it is to be understood that process 400 is not limited by the order of the sequence. For instance, some acts may occur in a different order than that described. In addition, an act may occur concurrently with another act. In some instances, not all acts may be performed.

At 402, rendering engine 122 receives a font file and a mapping file corresponding to a multi-part glyph. The font file and mapping file may be retrieved from memory device 112 or directly from font module 120 at runtime. The font file and mapping file may be generated according to the exemplary method illustrated with reference to FIG. 2. The font file provides rendering data describing separate part-glyphs associated with the multi-part glyph. The position of each part-glyph is described with reference to a common bounding box that encloses all the part-glyphs. The font file may be implemented in a TrueType or other font file format.

The mapping file provides configuration information of the multi-part glyph. The configuration information may include grouping information (e.g., number of part-glyphs, which part-glyphs are associated with the parent multi-part glyph), as well as the z-order of the associated part-glyphs. The mapping file further provides the individual properties of each part-glyph. Such individual properties may include color, which can result in a multi-color glyph being rendered. Other types of individual properties may also be provided.

At 406, rendering engine 122 renders each part-glyph as a separate layer. Rendering engine 122 generates an image of the multi-part glyph that can be presented (e.g., displayed or printed) via, for example, output device 104 or other medium. The multi-part glyph may be rendered by drawing each part-glyph as an additional layer according to the z-order and the properties specified in the mapping file. The z-order generally refers to the order of objects along the z-axis, where an object with a z-order of 1 would be visually "underneath" an object with a z-order of 2 or greater. The z-order is respected to prevent the smaller part-glyphs from being obscured by bigger part-glyphs. The part-glyphs are positioned with respect to a common bounding box.

Figure 5:
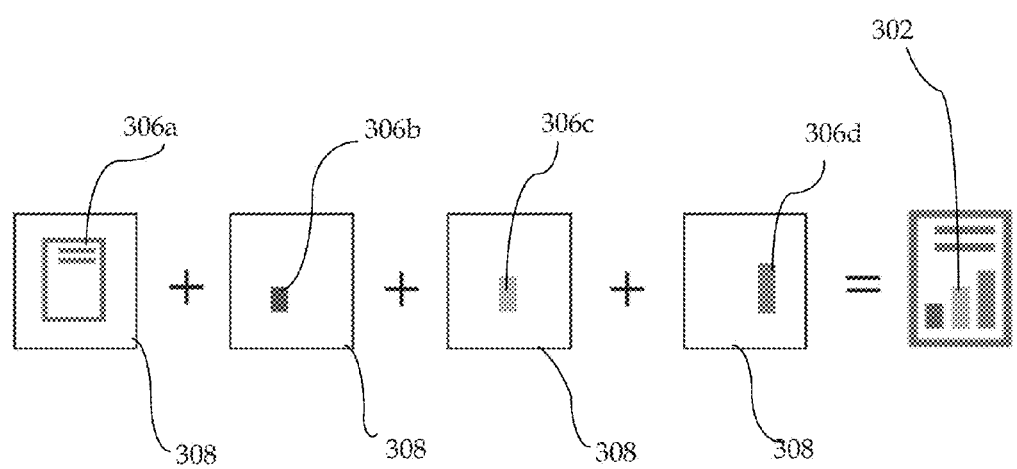
FIG. 5 illustrates an exemplary rendering process.

FIG. 5 illustrates an exemplary rendering process. The various part-glyphs 306a-d are retrieved from the font file. Each part-glyph is rendered as a separate layer according to the respective visual characteristics (e.g., color) and other properties. Each part-glyph is positioned relative to the common bounding box 308.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system, comprising:
   a non-transitory memory device for storing computer readable program code; and
   a processor device in communication with the memory device, the processor device being operative with the computer readable program code to perform steps including
   receiving a vector-based glyph,
   decomposing the glyph into multiple part-glyphs and generating a font file including rendering data of the part-glyphs, wherein the part-glyphs are individually configurable with separate visual characteristics, wherein the rendering data describes positions of the part-glyphs with reference to a common bounding box that encloses all the part-glyphs,
   individually configuring the part-glyphs with respective colors, and
   generating a mapping file that includes configuration information of the part-glyphs, wherein the configuration information includes grouping information, the respective colors and a z-order that specifies a sequence of rendering the part-glyphs as overlaid layers, wherein the z-order causes one or more layers of smaller part-glyphs to be overlaid over one or more layers of bigger part-glyphs to prevent the smaller part-glyphs from being obscured.

2. The system of claim 1 wherein the font file stores width, height and coordinates of corners of the bounding box.

3. The system of claim 1 wherein the mapping file is encoded using Extensible Markup Language (XML).

4. The system of claim 1 wherein the processor device is operative with the computer readable program code to render the part-glyphs as separate layers in accordance with the z-order.

5. A method, comprising:
   receiving a vector-based glyph;
   decomposing the glyph into multiple part-glyphs and generating a font file including rendering data of the part-glyphs, wherein the part-glyphs are individually configurable with separate properties, wherein the rendering data describes positions of the part-glyphs with reference to a common bounding box that encloses all the part-glyphs;
   individually configuring the part-glyphs with respective properties; and
   generating a mapping file that includes configuration information of the part-glyphs, wherein the configuration information includes grouping information, the respective properties of the part-glyphs and a z-order that specifies a sequence of rendering the part-glyphs as overlaid layers, wherein the z-order causes one or more layers of smaller part-glyphs to be overlaid over one or more layers of bigger part-glyphs to prevent the smaller part-glyphs from being obscured.

6. The method of claim 5 wherein generating the font file comprises storing width, height and coordinates of corners of the bounding box in the font file.

7. The method of claim 5 wherein generating the mapping file comprises generating the z-order.

8. The method of claim 5 wherein the respective properties of the part-glyphs comprise visual characteristics.

9. The method of claim 8 wherein the visual characteristics comprise colors.

10. The method of claim 5 wherein generating the mapping file comprises encoding the mapping file using a generic markup language.

11. The method of claim 10 wherein the generic markup language comprises Extensible Markup Language (XML).

12. The method of claim 5 further comprising rendering the part-glyphs as separate layers.

13. A non-transitory computer readable medium embodying a program of instructions executable by machine to perform steps comprising:
   receiving a font file corresponding to a multi-part glyph, wherein the font file includes rendering data of multiple part-glyphs associated with the multi-part glyph, wherein the part-glyphs are individually configurable with separate properties, wherein the rendering data describes positions of the part-glyphs with reference to a common bounding box that encloses all the part-glyphs;
   receiving a mapping file corresponding to the multi-part glyph, wherein the mapping file includes configuration data of the part-glyphs, wherein the configuration data includes grouping information, individual properties of the part-glyphs and a z-order that specifies a sequence of rendering the part-glyphs as overlaid layers, wherein the z-order causes one or more layers of smaller part-glyphs to be overlaid over one or more layers of bigger part-glyphs to prevent the smaller part-glyphs from being obscured; and rendering, at an output device, the part-glyphs as separate overlaid layers according to the configuration data.

14. The non-transitory computer readable medium of claim 13 wherein the font file stores width, height and coordinates of corners of the bounding box.

15. The non-transitory computer readable medium of claim 13 wherein the individual properties comprise colors.

* * * * *